United States Patent [19]
Leddy

[11] 4,336,288
[45] Jun. 22, 1982

[54] TECHNIQUE FOR PREVENTING SALT MIGRATION

[75] Inventor: Ernest J. Leddy, Whippany, N.J.

[73] Assignee: Bell Telephone Laboratories, Incorporated, Murray Hill, N.J.

[21] Appl. No.: 188,499

[22] Filed: Sep. 18, 1980

[51] Int. Cl.[3] .......................... B05D 7/22; B05D 5/08; B05D 3/02; B32B 1/02

[52] U.S. Cl. ...................................... 428/35; 422/102; 427/230; 427/239

[58] Field of Search .................. 427/230, 239; 428/35; 422/102

[56] References Cited

U.S. PATENT DOCUMENTS 2,688,568 9/1954 Miskel et al. ........................ 427/235
2,832,701 4/1958 Miskel et al. .......................... 427/2

OTHER PUBLICATIONS

"Standard Recommended Practice for Maintaining Constant Relative Humidity by Means of Aqueous Solutions" ASTM E 104-51 (Reapproved 1971).
Licari, "Plastic Coatings for Electronics", p. 52 (1970).
O'Brien, "The Control of Humidity by Saturated Salt Solutions" Journal of Scientific Instruments, Mar. 1948, pp. 73-76.

*Primary Examiner*—James R. Hoffman
*Attorney, Agent, or Firm*—J. P. Kearns

[57] ABSTRACT

A technique for preventing salt migration in a salt solution at elevated temperature involves selectively coating the container with an RTV (Room Temperature Vulcanizing) dispersion, allowing the dispersion to cure. The coating's slippery surface prevents the salt from creeping up the sides of the container.

6 Claims, 3 Drawing Figures

TECHNIQUE FOR PREVENTING SALT MIGRATION

FIELD OF THE INVENTION

This invention relates to apparatus and method for substantially inhibiting salt migration from a solution to the sides of a container.

BACKGROUND OF THE INVENTION

It is known that in saturated aqueous solutions certain salts maintain relative humidity at constant temperature. Excess salts in these solutions are required to cause the solution to remain saturated. American Society for Testing Materials (ASTM) Standard No. 104 describes the utility of this property of salt solutions in testing materials, components, devices, and parts for resistance to different humidity conditions. Electrical tests, for example, are conducted on printed circuit substrate materials from low to elevated temperatures and relative humidity to determine their stabiliy properties and the projected life at use conditions. These tests have widespread use in laboratories and could also have potential use in production environments to indicate how a particular material reacts to specific combinations of humidity and temperature.

The excess salt used to maintain a saturated solution causes a problem that heretofore has not been adequately addressed. The before-mentioned ASTM Standard No. 104 discusses the problem in this way:

> "Creepage distance over the surface of the container between the solution and the material being conditioned should be long enough to prevent the solution from creeping to the material being conditioned. Creeping is more likely to occur with some of the salts than with either glycerin or sulfuric acid solutions."

Thus, even the ASTM standard acknowledges that the problem exists, but does not address the elimination of the problem. Rather, it suggests that the problem can be avoided by moving the part or material being tested away from the salt solution so as to prevent the salt creepage from reaching the part. Many times this approach is not feasible as the part or material being tested is in an enclosed test chamber which may not allow an adequate distance between the part or material being tested and the solution. This salt creepage or migration oftentimes will contaminate the part or material being tested, thus rendering the test invalid. Salt creepage can occur at room temperature, but it occurs most frequently and rapidly at elevated temperatures, especially at temperatures above 85 degrees C. Salt contamination is a particular problem in the case of electrical tests for printed circuit materials in which the salt migration can alter the failure mechanism and invalidate the test. Ideally, resistance to salt should not be a factor in the testing procedure.

It is known that a ring of silicone grease compound applied to a container above the solution can be used to prevent the salt migration. One problem with this method is that the grease cannot be allowed to come into contact with the aqueous solution, as the grease will alter the solution's composition and thus change the test result. Another problem is the wide variations in the material characteristics of different lots and brands of the grease. Furthermore, the excess salt from solution has a tendency to push through the silicone grease and thereby still contaminate the part.

It is further known that plating and etching solutions and the like contain excess salts for maintaining proper conditions in the solution. Typically these salts are poisonous and can cause serious physiological injury. With the excess salt in solution salt could migrate from the solution under the proper conditions, thereby creating a hazardous situation for the users of such solutions.

It is an object of this invention to prevent the excess salt in an aqueous solution from creeping or migrating up the sides of a container, especially in cases of elevated temperature and relative humidity, and thereby prevent the salt contamination of materials or parts being tested in enclosed environments.

It is another object of this invention to prevent the excess salt in an aqueous solution especially at elevated temperatures and relative humidity from creeping or migrating up the sides of a container whereby the composition of the solution will remain essentially unaffected.

It is yet another object of this invention to prevent the excess salt in aqueous solution especially at elevated temperatures and relative humidity from creeping or migrating up the sides of a container and allow dangerous or hazardous salts to escape from the container and cause physiological harm to the user.

SUMMARY OF THE INVENTION

According to an embodiment of my invention, the desired portion of a container for an aqueous solution is coated with a room temperature vulcanizing (RTV) compound. This compound after application cures and by inhibiting the formation of nucleation sites creates a slippery surface which prevents the salts from "creeping" or climbing out of the container. The RTV when properly cured is inert and will not affect the test environment or test results. This process substantially eliminates the problem of salt contamination of parts in a relative humidity test and is especially effective in aqueous solutions maintained at high relative humidity and elevated temperatures.

My invention may find use in coating containers for plating and etching solutions in which hazardous or poisonous salts may be present to prevent the salts from creeping out of their container. The invention is adaptable to both laboratory and production environments.

BRIEF DESCRIPTION OF THE DRAWING

The above and other objects, features and advantages of my invention will become apparent from the following detailed description and the drawing in which.

DETAILED DESCRIPTION

Figure 1:
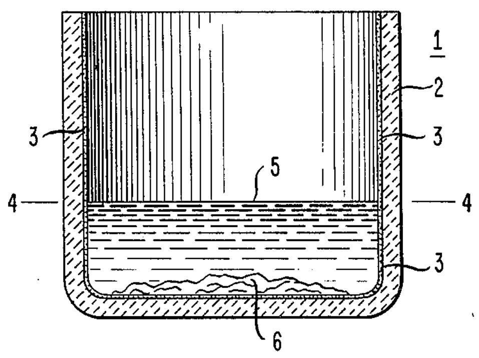
FIG. 1 is an illustrative embodiment of the invention used for preventing salt migration where the bottom and sides of a container are coated with the RTV compound.

In FIG. 1 room temperature vulcanizing (RTV) compound 3 is applied by pouring the compound into container 1. Due to its viscous properties the compound adheres to the bottom 2 and sides 4 of the container.

James J. Licari in his book *Plastic Coatings for Electronics* teaches examples of known RTV compounds. RTV compounds are cured silicone resins. The cure mechanism normally used to change these resins into RTV compounds is described at page 42 of the Licari book. According to this mechanism, "hydroxyl-terminated silicones polymerize by condensation with other hydroxyl-containing silicone species or with alkoxy silanes. In this process, water or alcohol is eliminated as a by-product. The mechanism for the curing is effected at room temperature or at elevated temperatures in the presence of specific catalysts, such as dibutyltin dilaurate, zinc naphthenate, iron octoate, stannous octoate, or the metal salts of other organic acids. Amine catalysts, such as triethanolamine, may also be employed.

Silicones prepared according to this procedure are often referred to as room temperature vulcanizing (RTV) types."

Some examples illustrated in the before-mentioned book are Dow Corning DC-3110 and DC-3112 and General Electric RTV 11 and RTV 40. These compounds previously have been used in coatings for electronic products. Some typical applications are insulation for heating cable, insulation for wires, circuit board coating, semiconductor junction coatings, and water repellents. These compounds have a wide temperature range and they have excellent electrical properties.

Oftentimes RTV compound 3 is diluted with xylene or a like material to allow the RTV compound to flow more easily to the bottom and sides of the container 1 and to achieve a uniform, void-free continuous coating. Compound 3 is cured normally at room temperature for 24 hours in addition to a subsequently elevated thermal cure at 150 degrees C. for 8 hours. Subsequently the aqueous salt solution 5 is added to the container 1. In the salt solution excess salt 6 resides in the bottom of the container 1.

Figure 2:
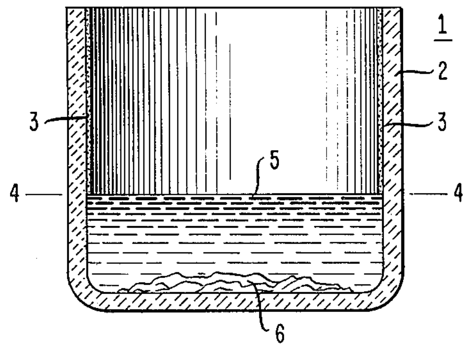
FIG. 2 is an illustrative embodiment of my invention where RTV is applied to the sides of a container above the level of the solution to the top of the container.
Figure 3:
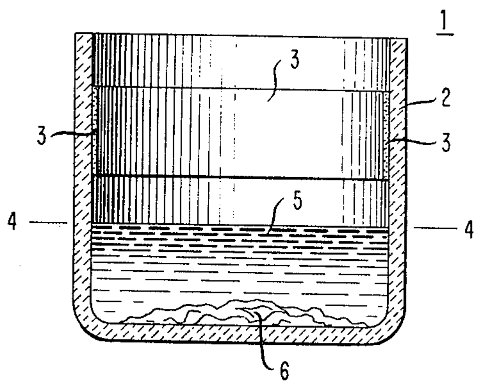
FIG. 3 is an illustrative embodiment of my invention where RTV is applied in a band at the sides of the container.

FIG. 2 is an illustrative embodiment of the invention where the RTV compound is applied on the sides of container 1 above the level of solution 5 to the top of the container. FIG. 3 is an illustrative embodiment where the RTV compound is applied in a band on the sides of the container above the solution. These embodiments have been effective in inhibiting the migration of salt.

There are many salts that are used to maintain relative humidity in saturated solutions over a wide range of temperatures. Some examples are $K_2SO_4$, KCl, NaCl. F. E. M. O'Brien in an article, "The Control of Humidity by Saturated Salt Solution", *Journal of Scientific Instruments*, March 1948, teaches that at 100 degrees C., for instance, the relative humidity above a saturated salt solution containing an excess of KCl (potassium chloride) is 74.7 percent; above a solution containing an excess of NaCl (sodium chloride), the relative humidity is 73.7 percent. The use of salts to maintain relative humidity is generally cheap and convenient and thus finds wide use in laboratory environment. Excess salt is required in the aqueous solution to maintain a saturated solution thus sustaining the desired equilibrium conditions. The creeping or migration of excess salt from solution, along the sides 6 of the container 1 in either of the FIGS. is inhibited by the slippery surface created by the RTV compound 3. This RTV compound is inert in its cured state and therefore will not affect the aqueous solution 5.

Samples of a printed circuit material with a fire retardant overcoat were tested electrically at elevated temperature (85 degrees C.) and relative humidity (80 percent) to compare the results of RTV coated containers to results from uncoated containers. No significant difference in these test results was observed. Small variations that were observed were attributed to variations in the temperature profile of the test oven used. This was confirmed and verified by additional testing of the printed circuit material in which the position of the containers was rearranged and a corresponding variation in the test results was noted.

Salt is only of concern when it creeps above the level of the solution; therefore, the embodiments as illustrated by FIG. 2 and FIG. 3 (where the compound is applied above the surface of the solution) have been equally effective inhibitors of salt migration.

This invention has found application in ASTM Standard No. 104 where an aqueous solution is used to maintain relative humidity at elevated temperature. For example, samples of printed circuit material are tested electrically at elevated temperature and humidity to obtain data which can be used to predict performance at conditions of normal use. These samples are tested at various temperatures and relative humidities using aqueous salt solutions. Some typical conditions are 85 degrees C. at 80 percent relative humidity, 65 degrees C. at 80 percent relative humidity, and 50 degrees C. at 95 percent relative humidity. These tests normally are scheduled to run for prolonged periods of time to determine the durability of the material. Oftentimes, however, the test has to be terminated earlier or interrupted for maintenance to remove salt from sides of the container. If the samples are heavily contaminated by salt it is difficult to draw meaningful conclusions about the intrinsic failure mechanism and life of the sample. The salt contaminants many times are found only on the front surfaces of the samples since the front surfaces were exposed and thus more likely to become contaminated due to salt bridging. A ring of silicone grease was typically applied to the sides of the container being tested and above the level of the aqueous solution. The silicone grease was found not to prevent the salt migration and thus parts were still contaminated by the salt. This invention would have substantially inhibited the salt migration in the above-mentioned test. The before-mentioned test is not limited to printed circuit material as there are many components, devices and the like which may be affected by salt contamination when exposed to aqueous salt solution environments. The ASTM Standard No. 104 test and similar tests may be used in conjunction with these components and devices.

This invention may also find use in plating and etching solutions and the like. Many times these solutions contain excess salts that are poisonous to humans. The above-mentioned method, if applied to plating containers, would prevent these poisonous salts from migrating or creeping out of the container and thereby eliminate these salts as a health hazard for users of these solutions.

While this invention has been disclosed by means of specific illustrative embodiments, the principles thereof are capable of a wide range of modification by those skilled in the art within the scope of the following claims.

I claim:

1. A method for inhibiting migration of excess salt from an aqueous solution in a container comprising the steps of coating the inside of said container with a room temperature vulcanizing silicone, allowing said silicone to cure so as to form a slippery surface within said container, and adding said solution to the container such that the slippery surface of said cured silicone substantially inhibits said migration while the composition of said solution remains essentially uncontaminated in the presence of said silicone.

2. The method of claim 1 including the step of allowing said silicone to cure by exposing said compound to room temperature for not over 24 hours and then heating said compound at 150 degrees C. for not over 8 hours.

3. The method of claim 1 further including the step of maintaining a predetermined relative humidity in the atmosphere above said solution with excess salt in said solution.

4. The method of claim 1 further including the step of heating said solution to an elevated temperature above room temperature after addition to said container.

5. The method of claim 4 including the step of heating said solution to a temperature of approximately 100 degrees C.

6. An apparatus comprising a vessel having walls for confining a saturated salt solution therein, the excess salt providing an atmosphere of stable humidity within said vessel above said solution characterized in that a room temperature vulcanizing silicone material is deposited on the walls of said vessel at the edges of the surface of said solution whereby the migration of said excess salt along said walls is inhibited.

* * * * *